United States Patent [19]

Escallon

[11] Patent Number: 5,799,157
[45] Date of Patent: Aug. 25, 1998

[54] SYSTEM AND METHOD FOR CREATING INTERACTIVE ELECTRONIC SYSTEMS TO PRESENT INFORMATION AND EXECUTE TRANSACTIONS

[75] Inventor: Andres Escallon, Wellesley, Mass.

[73] Assignee: Elcom Systems, Inc., Norwood, Mass.

[21] Appl. No.: 353,787

[22] Filed: Dec. 13, 1994

[51] Int. Cl.$^6$ .................. G06F 17/00; G06F 17/30
[52] U.S. Cl. ............. 395/227; 395/200.05; 395/615; 395/777; 364/401 R
[58] Field of Search ............. 395/200.09, 600, 395/650, 7, 200.05, 156, 161, 226, 227, 601, 609, 777, 778, 200.03, 671, 615; 348/7; 364/401 R

[56] References Cited

U.S. PATENT DOCUMENTS

| | | | |
|---|---|---|---|
| 4,011,545 | 3/1977 | Nadir | 395/200.01 |
| 4,370,707 | 1/1983 | Phillips et al. | 395/615 |
| 4,464,719 | 8/1984 | Spellman | 364/400 |
| 4,591,983 | 5/1986 | Bennett et al. | 395/65 |
| 4,623,963 | 11/1986 | Phillips | 395/712 |
| 4,796,179 | 1/1989 | Lehman et al. | 364/191 |
| 4,799,156 | 1/1989 | Shavit et al. | 395/226 |
| 4,811,325 | 3/1989 | Sharples, Jr. et al. | 369/85 |
| 4,839,835 | 6/1989 | Hagenbuch | 364/567 |
| 4,855,907 | 8/1989 | Ferro, Jr. et al. | 395/620 |
| 4,945,475 | 7/1990 | Bruffey et al. | 72/249 |
| 4,970,657 | 11/1990 | Wolf | 364/513 |
| 4,984,155 | 1/1991 | Geier et al. | 364/401 |
| 5,001,630 | 3/1991 | Wiltfong | 395/203 |
| 5,095,421 | 3/1992 | Freund | 395/650 |
| 5,109,482 | 4/1992 | Bohrman | 395/328 |
| 5,117,354 | 5/1992 | Long et al. | 395/227 |
| 5,133,045 | 7/1992 | Gaither et al. | 395/51 |
| 5,191,410 | 3/1993 | McCalley et al. | 348/13 |
| 5,216,593 | 6/1993 | Dietrich et al. | 364/402 |
| 5,233,520 | 8/1993 | Kretsch et al. | 128/630 |
| 5,249,270 | 9/1993 | Stewart et al. | 395/200 |
| 5,257,363 | 10/1993 | Shapiro et al. | 395/500 |
| 5,261,042 | 11/1993 | Brandt | 395/156 |
| 5,263,744 | 11/1993 | Linder | 283/115 |
| 5,310,997 | 5/1994 | Roach et al. | 235/375 |
| 5,315,508 | 5/1994 | Bain et al. | 364/401 |
| 5,319,542 | 6/1994 | King, Jr. et al. | 364/401 R |
| 5,319,745 | 6/1994 | Vinsonneau et al. | 395/777 |
| 5,324,922 | 6/1994 | Roberts | 235/375 |
| 5,325,534 | 6/1994 | Galy et al. | 395/700 |
| 5,339,392 | 8/1994 | Risberg et al. | 395/161 |
| 5,341,469 | 8/1994 | Rossberg et al. | 395/145 |
| 5,347,632 | 9/1994 | Filepp et al. | 395/200.05 |
| 5,351,276 | 9/1994 | Doll Jr. et al. | 379/67 |
| 5,361,199 | 11/1994 | Shoquist et al. | 395/226 |
| 5,371,532 | 12/1994 | Gelman et al. | 348/7 |
| 5,404,523 | 4/1995 | DellaFera et al. | 395/650 |
| 5,408,619 | 4/1995 | Oran | 395/280 |
| 5,418,945 | 5/1995 | Carter et al. | 395/600 |
| 5,442,749 | 8/1995 | Northcutt et al. | 395/200.09 |
| 5,528,490 | 6/1996 | Hill | 395/226 |

OTHER PUBLICATIONS

"Electronic Purchasing Service—The Untapped Opportunity in Corporate Purchasing" IBM Technical Literature, 1995.

"The Internet—How it will change the way you do business" *Business Week*, Nov. 14, 1994, pp. 80–88.

"No lines on–line" *Boston Globe*, Dec. 6, 1994, pp. 43 and 52.

*Primary Examiner*—Dinh C. Dung
*Attorney, Agent, or Firm*—Calfee, Halter & Griswold, LLP

[57] ABSTRACT

A fully integrated system and method for production and presentation of dynamically linked electronic presentation of information to front end client computers, for providing dynamic access to information from front end client computers, and for formulating, transmitting and processing transactions based upon information presented and accessed is disclosed. The system and method provides for production of a system for presentation of information to front end client computers in the form of customized electronic books linked to databases of the information presented. The electronic books further include forms for entry of transaction requests based upon such information. The forms are coded for execution of the particular transaction requested thereon by a transaction management system connected to one or more transactional databases.

18 Claims, 2 Drawing Sheets

5,799,157

1

SYSTEM AND METHOD FOR CREATING INTERACTIVE ELECTRONIC SYSTEMS TO PRESENT INFORMATION AND EXECUTE TRANSACTIONS

FIELD OF THE INVENTION

The present invention relates generally to computer systems and methods of use and, in particular, to creation of interactive computer systems which present information and execute transactions.

BACKGROUND OF THE INVENTION

It is known to integrate computer systems and databases to accomplish wide dissemination of information and execution of related transactions. An example of a system for presenting information to remote users or clients who may examine the information and initiate some transaction based thereon is found in catalog procurement systems. In the field of automated catalog procurement systems, Geier, et al., U.S. Pat. No. 4,984,155 disclose a method and system in which a data terminal displays product information to a customer which augments or supplements information from a supplier catalog, and through which a customer may place orders for products. King and Nilsen, U.S. Pat. No. 5,319, 542, disclose a system by which users can order items from suppliers through an electronic catalog and electronic requisition facility which relies on maintenance of a public catalog or catalog database on a public computer system. An article in *Business Week* magazine ("The Internet", Nov. 14, 1994, p. 80) describes an "electronic catalog that can automatically pass data to its back-office computers [via the Internet]. When a browser decides on an item . . . she just clicks on a 'buy' button and it is added to an electronic order form." An article in The Boston Globe ("No Lines On-Line", Dec. 6, 1994, p. 43) describes on-line shopping services with graphics and photographs. Blutinger and Kiernan, U.S. Pat. No. 5,231,566, disclose a method and apparatus for producing by computer a catalog of items to be offered for sale in which each item contains a unique catalog item number.

While these represent improvements over more traditional methods such as the use of printed media, they still do not insure the proprietor of the transaction management system maximum flexibility in designing the ways in which information is disseminated, the formats through which clients may manipulate and interact with such information and the manner in which transactions initiated by client responses to the information are structured, sequenced and executed. Some electronic catalogs convey information about products and prices through multimedia presentations (with, e.g., pictures, video, sound and text), but such presentations are not fully integrated with the facility to execute transactions automatically. Those designed as on-line systems can be costlier to maintain and operate than client-server systems. Some systems do not provide users with the combination of fast access and update capability to product, price and availability information (which changes regularly) and multimedia presentation capabilities. Additionally, systems that rely on pre-existing communications links (such as the Internet or Compuserve) may not be appropriate for some client-server transactions. Finally, systems designed expressly for use as electronic catalogs may not be readily adaptable to other applications.

The foregoing limitations stem from the absence of an adaptable development system for creating interactive electronic systems combining multimedia presentations with automated transactions in a highly flexible environment definable by the proprietor of the transaction management system.

2

SUMMARY OF THE INVENTION

The present invention provides a system and method for creating a fully integrated interactive computer system for presentation of information to client computers and execution of transactions related to such presented information. The invention provides means for any entity to fully implement and control wide dissemination of information and processing of related transactions.

In accordance with one aspect of the invention, a system and method for creating a system for the presentation of information and processing of transactions based upon such information includes a production system for compiling and coding an electronic book including information presentation pages, databases associated with the presentation pages, and coded forms for receiving and formulating transaction requests based upon such information.

In accordance with another aspect of the invention, a system and method for presenting information, formulating transaction requests based upon such information, and processing requested transactions in connection with related databases includes client computers for presenting information in the form of electronic books, related databases and coded forms for formulating transaction requests based upon such presented information, a transaction management system for processing transaction requests transmitted as coded forms from client computers, and transactional databases for executing the requested transactions.

These and other aspects of the invention are described below in detail with reference to the accompanying Figures.

DETAILED DESCRIPTION OF PREFERRED EMBODIMENTS AND METHODS

Figure 1:
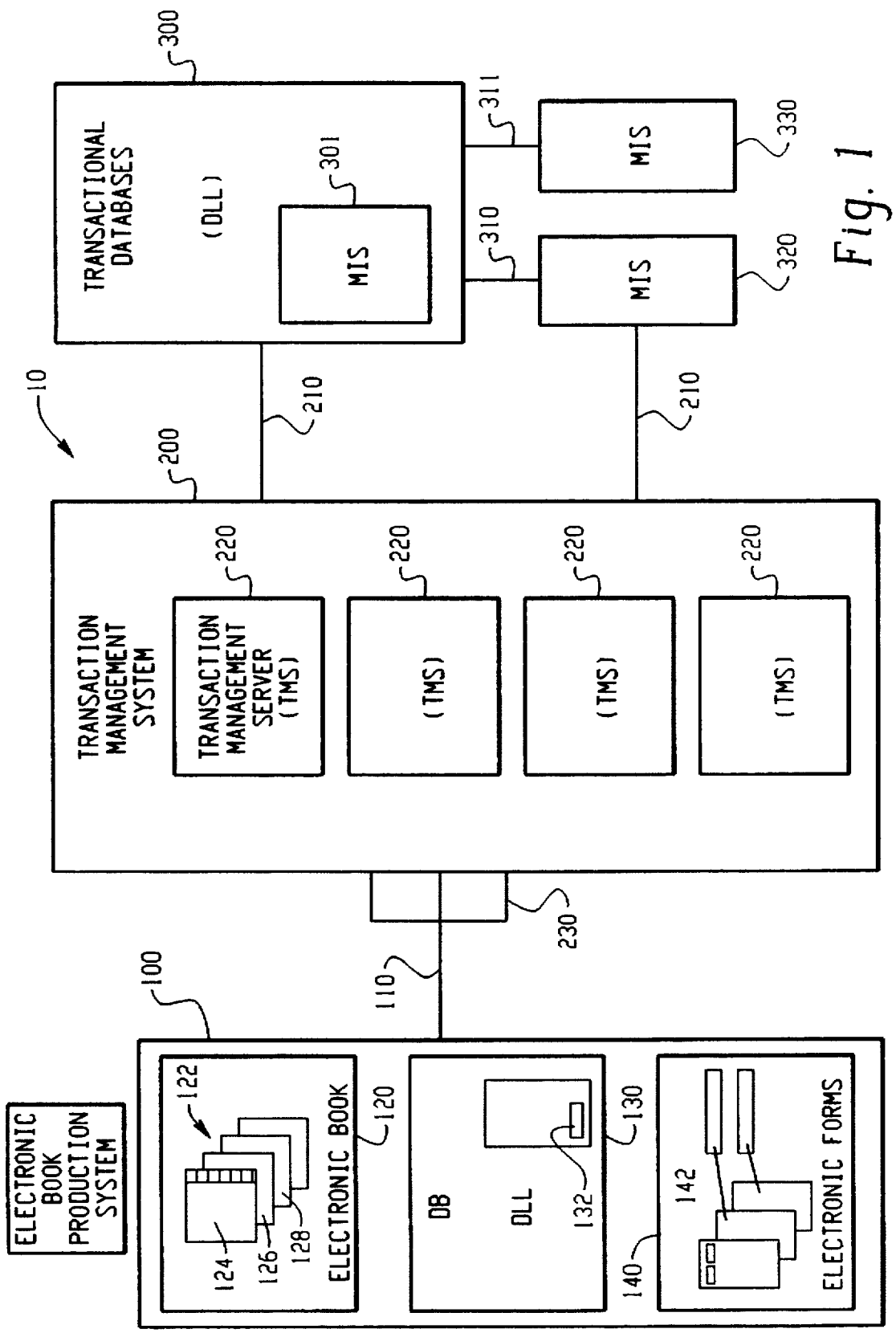
FIG. 1 is a schematic block diagram of the data presentation and transaction management system in accordance with the present invention.

The multi-media data presentation and transactional computer system 10 of the invention, represented schematically in FIG. 1, utilizes in its broadest implementation at least three main interactive components including client computers 100, which function as front end user interfaces by and through which front end users access and interact with the other main components; a transaction management system 200, connectable by a communications link 110 to the client computer 100 and by and through which data presentations and transactions are executable, and transactional databases 300 accessible by the transaction management system 200 through a communications link 210. This fundamental novel arrangement of the system 10 and related methods of creating and using provide for wide range multi-media presentation of any kind of information and interactive execution of transactions in connection with large numbers of client computers 100 and transactional databases 300.

Figure 2:
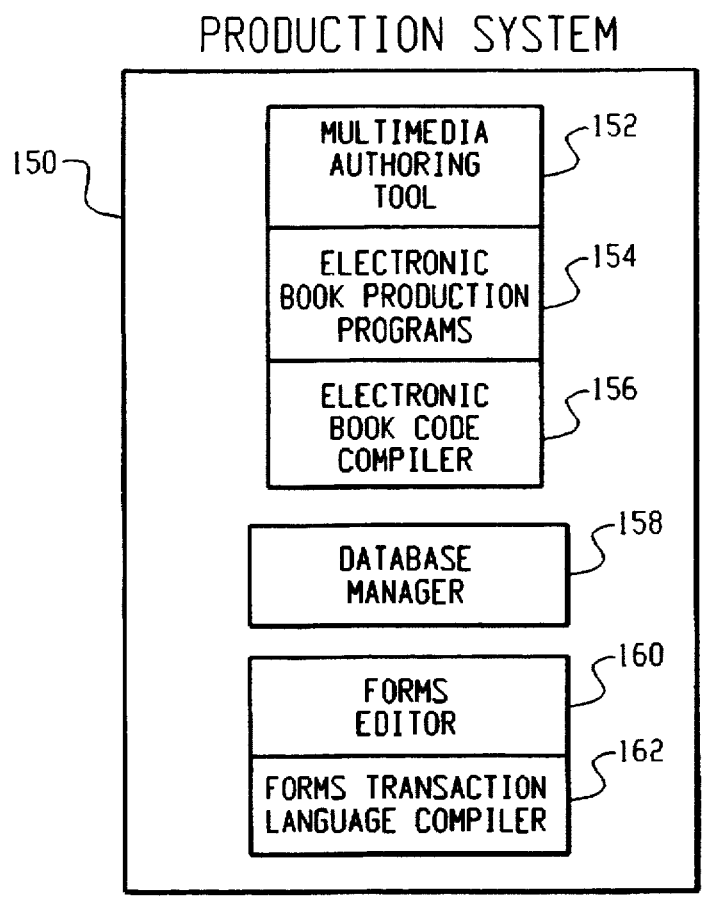
FIG. 2 is a schematic block diagram of the production system of the data presentation and transaction management system in accordance with the present invention.

As further detailed by additional reference to FIG. 2, the initial data contents of the client computers 100 is created or compiled in accordance with desired data presentations and/or transactions to be presented and/or requested at the client computers 100 in the form of an electronic book 120 generated by an electronic book production system 150. The data contents of the electronic book 120, includes for example any combinations of static or dynamic presentations of text, graphics, audio and video information, control functions and hyper-link entry points which collectively define the appearance and computing function of pages 122 of the book presentable by display upon monitors of client computers 100 and through related multi-media hardware. The production system 150 may include, for example, a multi-media authoring tool 152 for producing the electronic book 120, other electronic book production programs 154 such as graphics generators and editors, and a corresponding electronic book code compiler 156. The electronic book may be adapted and programmed to run as a Windows application. The data contents of the client computers 100 may further include other compatible databases and/or programs resident on the client computers and accessible through the system software.

The data content of individual pages 122 can be selectively created and arranged according to any particular intended use of the system. The type of data content suitable for presentation by the system may include any information desired to be communicated, disseminated or presented and for execution of transactions based upon or related to such information. For example, in the application of the invention to the electronic presentation of any printed text the data may include a cover page, table of contents pages, and individual pages of course presenting information related to entries on the table of contents page(s). In the application of the invention to the collective presentation of data on products offered for sale (i.e., an electronic catalog) there may similarly be compiled for sequential or selective display a cover page 124, table of contents page(s) 126, and individual pages 128 dedicated to individual products or similar types of products. The various pages of the electronic book may be commonly or dissimilarly formatted with, for example, standard or unique graphics fields and background or color attributes, framing, size, legend, numbering, frame sequencing, background/foreground shading for 3-D imaging, etc., and include program selection and control features such as buttons and icons.

The data content of the client computer 100 further includes databases 130 having data entries which correspond to fields of displayed pages bound to the electronic book program at load or run time such that data contained in databases 130 relevant or related in any way to data displayed by the electronic book pages is accessible by the client computer from the electronic book program, i.e., from any of the displayed pages. The databases 130 are in a preferred embodiment of the invention compatible with the dBase program to facilitate direct access. However, other proprietary database programs such as Sybase, Oracle, Informix, SQL Server, Lotus Notes, may be utilized in the client computer 100 as dynamically linked libraries (DLL) accessible through open database connectivity (ODBC). The application of the invention is not limited to the presentation and/or management of transactions relative to any particular type or kind of data or subject matter.

In addition to the dynamic linking of data presented by the pages with data contained in the databases 130, by selective programming of hyperlink entry points on selected pages, the display of individual pages can be dynamically controlled to provide the front end client computer user with control over the sequence and content of the presentation. For example, in a multi-media page presentation which includes a sequence of graphic images such as a slide show, control buttons may be provided on the page to enable the user to pause, forward, reverse and/or skip as desired. Similarly, in the instance where additional data related to the data of the displayed page is retrieved in, for example, the form of a spreadsheet or tables, dynamic page controlling can be used to scroll through a long list only partially displayed or sub-displayed in a window on any particular page.

The databases 130 are produced by a database manager 158 of production system 150 which constructs and/or codes a database of information related to information of pages 122 by establishing key fields linked to pieces of information of pages 122 with data in the databases 130.

The data content of the client computer 100 still further includes electronic forms 140 generated by a forms editor 160 and forms transaction language compiler 162 to provide formats for entry of coded transaction requests relevant to and based upon displayed data and/or additional data in the databases 130. The electronic forms 140 include display formats in the manner of a spreadsheet which physically define fields for entry of data to formulate transaction requests. For example, in the implementation of a product catalog, a purchase list form can be accessed and filled out from a displayed page, and data entered on such list converted to another form such as a purchase order. The electronic forms utilize placeholders 142 correlated to data entry fields on the forms and to corresponding data addresses 132 of appropriate data to be entered in any particular field. Each forms placeholder 142 has an associated variable name. The variable name tells the placeholder what type of data is to be input in a particular field. This aspect of the system may be programmed to be dynamically editable whereby all variable names of the placeholders are identified by the program by associated data in the databases 130 so that as data is added or otherwise edited in the databases 130 all necessary corresponding edits to the forms variable names are automatically made. Similarly, as edits to the forms are made, the associated transactional language may be edited. The forms transaction language compiler 162 provides transaction assembly language that runs on a virtual machine to execute a particular transaction or transactions associated with a particular form.

By the aforedescribed hardware arrangements and methods of use, the invention novelly provides a system for creating a system for the presentation of information in a relational environment to front end client computers, for selectively viewing, accessing and manipulating such data, and selectively formulating transaction requests based upon such data for transmission to the transaction management system 200 for execution as described below. As used herein, the term "formulate" means the selection and entry of information into a format which can be transmitted and processed, the term "transaction" means the carrying out of any instructions or requests represented by selected and formatted information, and the term "creating" means the neccesary arrangement of hardware programming to accomplish integration of information to be presented and used by the system to effect transactions.

Figure 3:
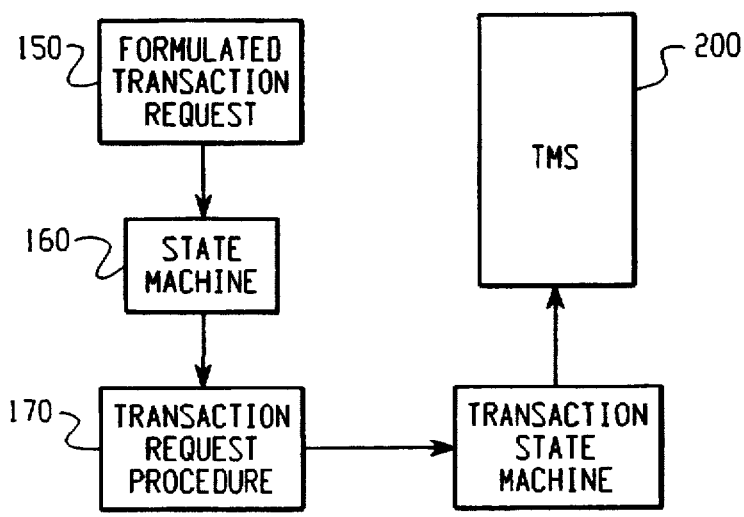
FIG. 3 is a schematic block diagram of a state machine data transmission routine in accordance with the present invention.

Dynamic real time or live data interaction between the client computers 100 and the transaction management system 200 is accomplished by the use of state machines between the two components. With reference to FIG. 3, formulated transaction requests 150, for example in the form of purchase orders for goods or services (such as for example travel arrangements and tickets), mortgage or credit applications, admissions application, computer search queries, requests for any type of information (such as for example government publications or annual reports of corporations), etc. are transmitted as completed forms from the client computer 100 to the transaction management system 200 by the interaction of at least two state machines. A state machine program 160 of the client computer 100 creates and initiates a formulated transaction request procedure 170 to initiate the transmission of a formulated transaction request, followed by a subsequent consequent state of, for example, "request sent", "transmission OK", or "transmission failure". A subsequent consequent state may be "response received" and/or "time out" to wait for an appropriate response from the corresponding state machine program 230 of the transaction management system 200. Specified (standard) transactions are controlled, executed or edited according to unique procedure numbers within transaction sets in the corresponding state machine programs. Thus the client computer user can initiate and control transactions with the transaction management system by getting to and through specified states in predetermined transaction sets, in a manner similar to customer control of automated teller machines.

The transaction management system 200 includes multiple transactional management servers 220 connected by communications link or links 110 to client computers 100, and by communications link 210 to transactional databases 300 which include, for example, company or establishment management information services (MIS) 320 which, by suitable database access programs, actually perform the necessary computing functions to fulfill transaction requests. In any mass market implementation of the invention the transactional management servers 220 are therefore database (MIS) program servers whereby large numbers of client computers can access and retrieve requested information and/or responses from large numbers of databases.

In preferred implementations of the system, the transactional management servers are accessing remote transactional databases 300 to fulfill most transaction requests. However, in the implementation of the system to the marketing and sale of products offered by single retail establishment, a separate MIS system 301 of the retailer, for example in the form of a programmable controllable database such as Oracle, is accessed by client computers 100 through the transactional management servers 220. To fulfill and confirm the successful completion of all aspects of any particular transaction with the retailer, the retailer MIS 301 may further access another company's of entity's MIS 320 such as, for example, a credit card administrator's MIS 322 or a shipping company's MIS 324 package tracking system. The transmission and/or access of transaction instruction data contained in additional MIS systems may also be accomplished in accordance with the invention by the use of virtual machine coding compiled with the forms 140 for execution by the transaction management system 200. By editing the accompanying transaction coding with any edits to the forms, user programmable transaction requests are provided.

The communication links 110 and 210 of the system preferably interface with open network environments through dedicated network communication servers 230 which provide network access to the client computers by proxy to effect socket extensions.

I claim:

1. A method executed in a computer system for presenting data and executing transactions, the computer system including at least one client computer, a transaction management system having at least one transaction management server, and at least one transactional database, the method comprising the steps of:
   providing an electronic book on a client computer, the electronic book including data for presentation to a user of the client computer;
   providing a client database on the client computer, the client database including data corresponding to the data in the electronic book;
   providing an electronic form on the client computer, the electronic form including data for execution of a transaction relating to the data in the electronic book and to the data in the client database;
   presenting the electronic book to the user by displaying the electronic book to the user;
   enabling the user to selectively view the data in the electronic book;
   when the user desires to execute a transaction relating to the data in the electronic book, presenting the electronic form to the user by displaying the electronic form to the user;
   enabling the user to selectively enter information into the electronic form, the information specifying the transaction desired to be executed by the user;
   sending the information specifying the transaction desired to be executed by the user to a transaction management server in a transaction management system;
   accessing a transactional database for executing the specified transaction; and
   executing the specified transaction.

2. The method of claim 1, wherein the step of providing an electronic book on a client computer includes the step of providing an electronic catalog on the client computer, the electronic catalog including a cover page, a table of contents page, and individual pages relating to products offered for sale in the electronic catalog.

3. The method of claim 1, further including the steps of:
   providing a placeholder corresponding to specific data in the client database and to specific data in the electronic form; and
   using the placeholder to automatically edit the specified data in the electronic form when the specified data in the client database is edited.

4. The method of claim 1, wherein the step of providing an electronic form on the client computer includes the step of providing a plurality of electronic forms on the client computer, the plurality of electronic forms including a purchase list electronic form and a purchase order electronic form.

5. The method of claim 4, further including the step of:
   automatically converting the purchase list electronic form into the purchase order electronic form when the user selectively enters information into the purchase list electronic form.

6. A computer system for presenting data and executing transactions, the computer system comprising:
   a client computer, the client computer including:
      an electronic book, the electronic book including data for presentation to a user of the client computer,
      a client database, the client database including data corresponding to the data in the electronic book,
      an electronic form, the electronic form including data for execution of a transaction relating to the data in the electronic book and to the data in the client database,
      a display device that presents the electronic book to the user by displaying the electronic book to the user enabling the user to selectively view the data in the electronic book, and that presents the electronic form to the user by displaying the electronic form to the user when the user desires to execute a transaction relating to the data in the electronic book, and an input device that enables the user to selectively enter information into the electronic form, the information specifying the transaction desired to be executed by the user;

a transaction management system having a transaction management server, the transaction management server receiving the information specifying the transaction desired to be executed by the user; and a transactional database, the transactional database being accessed by the transaction management server for executing the specified transaction.

7. The computer system of claim 6, wherein the electronic book includes an electronic catalog, the electronic catalog including a cover page, a table of contents page, and individual pages relating to products offered for sale in the electronic catalog.

8. The computer system of claim 6, further including:

a placeholder corresponding to specific data in the client database and to specific data in the electronic form, the placeholder being used to automatically edit the specified data in the electronic form when the specified data in the client database is edited.

9. The computer system of claim 6, wherein the electronic form includes a plurality of electronic forms, the plurality of electronic forms including a purchase list electronic form and a purchase order electronic form, the purchase list electronic form being automatically converted into the purchase order electronic form when the user selectively enters information into the purchase list electronic form.

10. A method executed in a computer system for presenting data and executing transactions, the computer system including at least one client computer, a transaction management system having at least one transaction management server, and at least one transactional database, the method comprising the steps of:

providing an electronic book on a client computer, the electronic book including data for presentation to a user of the client computer, the electronic book being stored entirely on the client computer;

providing a client database on the client computer, the client database including data corresponding to the data in the electronic book, the data in the client database being dynamically linked to the data in the electronic book and being accessible from the electronic book, the client database being stored entirely on the client computer;

providing an electronic form on the client computer, the electronic form including data for execution of a transaction relating to the data in the electronic book and to the data in the client database, the electronic form being stored entirely on the client computer;

presenting the electronic book to the user by displaying the electronic book to the user;

enabling the user to selectively view the data in the electronic book;

when the user desires to execute a transaction relating to the data in the electronic book, presenting the electronic form to the user by displaying the electronic form to the user;

enabling the user to selectively enter information into the electronic form, the information specifying the transaction desired to be executed by the user;

sending the information specifying the transaction desired to be executed by the user to a transaction management server in a transaction management system;

accessing a transactional database for executing the specified transaction; and executing the specified transaction.

11. The method of claim 10, wherein the step of providing an electronic book on a client computer includes the step of providing an electronic catalog on the client computer, the electronic catalog including a cover page, a table of contents page, and individual pages relating to products offered for sale in the electronic catalog.

12. The method of claim 10, further including the steps of:

providing a placeholder corresponding to specific data in the client database and to specific data in the electronic form; and using the placeholder to automatically edit the specified data in the electronic form when the specified data in the client database is edited.

13. The method of claim 10, wherein the step of providing an electronic form on the client computer includes the step of providing a plurality of electronic forms on the client computer, the plurality of electronic forms including a purchase list electronic form and a purchase order electronic form.

14. The method of claim 13, further including the step of:

automatically converting the purchase list electronic form into the purchase order electronic form when the user selectively enters information into the purchase list electronic form.

15. A computer system for presenting data and executing transactions, the computer system comprising:

a client computer, the client computer including:

an electronic book, the electronic book including data for presentation to a user of the client computer, the electronic book being stored entirely on the client computer, a client database, the client database including data corresponding to the data in the electronic book, the data in the client database being dynamically linked to the data in the electronic book and being accessible from the electronic book, the client database being stored entirely on the client computer, an electronic form, the electronic form including data for execution of a transaction relating to the data in the electronic book and to the data in the client database, the electronic form being stored entirely on the client computer, a display device that presents the electronic book to the user by displaying the electronic book to the user enabling the user to selectively view the data in the electronic book, and that presents the electronic form to the user by displaying the electronic form to the user when the user desires to execute a transaction relating to the data in the electronic book, and an input device that enables the user to selectively enter information into the electronic form, the information specifying the transaction desired to be executed by the user;

a transaction management system having a transaction management server, the transaction management server receiving the information specifying the transaction desired to be executed by the user; and a transactional database, the transactional database being accessed by the transaction management server for executing the specified transaction.

16. The computer system of claim 15, wherein the electronic book includes an electronic catalog, the electronic catalog including a cover page, a table of contents page, and individual pages relating to products offered for sale in the electronic catalog.

17. The computer system of claim 15, further including:

a placeholder corresponding to specific data in the client database and to specific data in the electronic form, the placeholder being used to automatically edit the specified data in the electronic form when the specified data in the client database is edited.

18. The computer system of claim 15, wherein the electronic form includes a plurality of electronic forms, the plurality of electronic forms including a purchase list electronic form and a purchase order electronic form, the purchase list electronic form being automatically converted into the purchase order electronic form when the user selectively enters information into the purchase list electronic form.

* * * * *